Patented July 7, 1953

2,644,784

UNITED STATES PATENT OFFICE 2,644,784

PREPARATION OF PEPSINOGEN AND PEPSIN

Eugene P. Kennedy and Myron D. Grossnickle, Chicago, Ill., assignors to Armour and Company, Chicago, Ill., a corporation of Illinois No Drawing. Application November 16, 1950, Serial No. 196,096

6 Claims. (Cl. 195—66)

This invention relates to the preparation of pepsinogen and pepsin from raw sources of pepsinogen such as animal stomach linings, etc.

The recovery of pepsinogen or pepsin from animal stomach linings and other sources with a very substantial yield of pepsinogen or pepsin has presented an important problem because of the solubility of the inert protein upon which the pepsinogen is adsorbed and because of the tendency of the fat contained by said protein when again suspended in water and subjected to enzymatic action to form an emulsion. The problem is further increased because of the difficulty of keeping the pepsinogen unconverted through a sequence of steps in which the pepsinogen is conditioned for recovery or for final recovery in the form of pepsin. The emulsion resists breaking by centrifuging or filtering and even long periods of settling are ineffective. As a result, considerable losses of the pepsinogen and/or pepsin are suffered.

An object of the present invention is to provide a process for the recovery of pepsinogen and/or pepsin through the use of simple and inexpensive steps, and while obtaining a high recovery of the desired product. A further object is to provide a process which overcomes the difficulties described above with regard to the forming of an emulsion while obtaining the high yield of pepsinogen or pepsin. Yet another object is to provide a process in which expensive reagents heretofore believed necessary are omitted while employing water for the extraction step and overcoming the resulting tendency to form emulsions by very simple and inexpensive steps. A still further object is to provide a process for the production of pepsinogen with an extremely high yield, while at the same time providing for the ready conversion of pepsinogen to pepsin and the recovery of the latter as a substantially pure product. Other objects and advantages will appear as the specification proceeds.

In a process exemplifying one phase of our invention, a raw source of pepsinogen, such as animal stomach linings, is extracted in an aqueous solution at a low temperature. The temperature may be from 0° to +10° C., but we prefer to carry on the process at a temperature in the neighborhood of 0° C. and in the range of 0° to 5° C. Water may be employed as the only medium of extraction. However, if desired, the pH of the suspension may be made alkaline to the pH of the tissue by adding alkali to the suspension. The suspension is stirred to complete the extraction. The tissue may then be separated from the extract by any convenient method, such as, for example, centrifugation. The extract is found to contain pepsinogen in extremely high yield.

The extract may then be adjusted to a pH range of 3 to 4.5 at about 0° C. as by the use of strong acids, such as HCl, $H_2SO_4$, $H_3PO_4$, $HNO_3$. We find that the pepsinogen is adsorbed upon the inert protein and that such inert protein with the pepsinogen adsorbed thereon is precipitated by adjusting the pH range as indicated. The resulting precipitate is composed of inert protein and pepsinogen.

The precipitate obtained as described may be suspended in from one to two volumes of water and the temperature raised to, say, about 37° C. for about 2 hours. During digestion, there is a conversion of pepsinogen to pepsin.

When the precipitate upon which adsorbed pepsinogen is resuspended in water and the temperature thereof raised for converting the pepsinogen to pepsin, it is found that the enzymes act upon the fat present and produce an emulsion. The emulsion is extremely persistent and a recovery of pepsin in substantial amounts is prevented. We have discovered that if the temperature of the resuspended precipitate and adsorbed pepsinogen is kept low, preferably below 37° C., and an organic solvent added to serve as a defatting agent, the temperature can then be raised to above 37° C. for converting the pepsinogen to pepsin, without producing an emulsion. We have also discovered that the raising of the temperature after introducing the organic solvent brings about a change of solubilities so that the resulting pepsin is dissolved in the water and the suspended protein material may be readily separated by centrifuging or filtering, etc. By this process, the separation is accomplished rapidly while producing a clear or brilliant filtrate, and the activity of the finished product is extremely high. The recovered solution of pepsin may be recovered as such or the solution may be dried to recover the pepsin as a dry product.

Any organic solvent which is moderately soluble in water (5% to 40%), such as diethyl ether, normal butanol, ethyl acetate, methyl ethyl ketone, or a solvent insoluble in water, such as ethylene dichloride, may be employed. At the same time the protein is precipitated and is easily removed. The pepsin solution is then filtered and may be recovered as a solution or dried.

The above specific outline of one exemplary method may be varied considerably depending upon the particular source of pepsinogen being extracted, the character of the product desired, etc. It will be understood that the extract obtained after the removal of the linings in the centrifuging operation may be concentrated and the product sold as a finished product. We prefer, however, to have the pepsinogen adsorbed upon the inert protein material in the solution and to obtain it in the resulting precipitate caused by lowering the pH to about 3.7. The time of extraction and of the different treating steps will also depend upon the specific material being treated, the fineness of its grind, and the character of the product desired.

As a more specific illustration, the following example may be set out. Hashed or ground hog stomach linings were extracted with about four volumes of water and at 0° C. for 4½ hours. The suspension was made alkaline to the pH of the tissue by adding to the suspension about 30 milliequivalents of alkali for each kilogram of tissue taken. The suspension was stirred during the extraction period. After the extraction period, the material was centrifuged to remove the linings. The extract was then treated with hydrochloric acid to reduce the pH to about 3.7 at about 0° C., producing a precipitate. The precipitate was removed from the suspension by centrifugation. A portion of the precipitate was then dried in the cold, i. e., from the frozen state and under vacuum, to produce a pepsinogen product.

The remaining and larger portion of the precipitate was resuspended in water and the forming of an emulsion was prevented by adding to the solution diethyl ether to bring about a precipitate of the inert protein material. After the addition of the organic solvent, the temperature was raised to between 37° C. and 45° C. to convert the pepsinogen into pepsin and the resulting pepsin solution was filtered and dried.

We have found that when the extraction step is carried on at a low temperature near 0° C., and preferably not above +10° C., an unusually effective removal of pepsinogen is accomplished, with a potency, based on activity per unit weight of dissolved material, that is very high. The deleterious effect of higher temperatures on the labile proenzyme is avoided, while the solubility of the inert material in the animal stomach linings is sharply limited. In our process, extraction can be effectively carried on by water alone or by the use of water with a small amount of alkali. The use of other expensive reagents is not needed. In the precipitating step induced by the adjustment of the pH into the range of 3 to 4.5 at about 0° C., removal of the pepsinogen to a major extent is accomplished by the adsorption thereof on protein impurities. These impurities are protein impurities present in the original extract and they serve as means for collecting pepsinogen thereon and, in the ensuing precipitating step, removing them as adsorbed materials in the precipitate. The precipitated material and adsorbed pepsinogen are suspended in water and there is added an organic solvent so that a clear filtrate is obtained having an unusually high yield of pepsin, the pepsinogen being converted to pepsin by the increase in temperature above 37° C. after the addition of the organic solvent.

While we have described several materials that may be employed in the separation of the inert protein from the pepsin and simple steps for such separation, it will be understood that many methods may be used and that a large variety of solvents other than those mentioned may be employed in connection with other separation steps. The removal of the inert protein may be accomplished by any convenient means such as filtration, decantation, or other well-known means.

As specific examples of the processes, the following may be set out:

Example I

Ten kilograms of frozen ground hog stomach linings were suspended in 40 liters of cold water. The suspension was maintained between 0° and 5° C. for one-half hour. At the end of this period, the tissue was removed by centrifugation, yielding 45 liters of extract containing a proteolytic activity equivalent to 62 mg./ml. of 1–3000 pepsin (National Formulary Standard) as determined by the Anson-Mirsky hemoglobin assay method.

The tissue, approximately 7 kilograms, was resuspended in 40 liters of cold water, as above, and extracted for one-half hour, yielding 40 liters of extract containing a proteolytic activity equivalent to 8 mg./ml. of 1–3000 pepsin. This extract may be combined with the initial extract or may be utilized as the solvent in the extraction of fresh quantities of frozen hog stomach linings, as in Example 2.

The initial extract was adjusted to pH 3.68 by the addition of 88.5 ml. of 6 N. HCl. The suspension was maintained between 0° and 5° C. for 18 hours before centrifugation. The precipitate weighed 1.933 kg. and contained 87% of the activity in the initial extract.

170 gms. of the precipitate was suspended in 340 cc. portions of cold water with agitation. After the suspension was complete, we added 8 cc.'s of ethylene dichloride and placed the same in a 37° C. incubator for 16 hours. At the end of 16 hours we removed the supernatant liquid by siphoning, adding ½% Standard to the supernatant, and we then filtered through D–2 precoated Standard pad. The settling was 510 cc.'s to 95. We removed 395 cc.'s as supernatant liquid. The filtrate was clear, the rate of separation was rapid, and the activtiy of the final product was 215 mg./cc.

Example II

The forming of the precipitate having the pepsinogen adsorbed thereon was produced as described in Example I except that the extraction continued for 18 hours. The precipitate was then suspended in an equal weight of water and 8 cc.'s of ethylene dichloride added. The temperature was raised to 37° C. for 16 hours, the supernatant removed, and the filtrate filtered as described in Example I. The settling was 500 to 95 cc. We removed as supernatant liquid 395 cc. The rate of separation was rapid. The activity of the product was 125 mg./cc.

Example III

A precipitate containing the adsorbed pepsinogen was obtained as described in Example I except that the extraction was carried on for 4 hours. The remainder of the process was carried through as described in Example I. The settling was 515 to 75 cc. We removed as supernatant liquid 420 cc. The rate of separation was rapid and the filtrate was clear. The activity of the final product was 130 mg./cc.

Example IV

A precipitate having pepsinogen adsorbed thereon, produced as described in Example II, was suspended in the proportion of 170 gms.

within 340 cc.'s of water. ½% of ethylene dichloride was added to the liquid while still cold and below 37° C. The temperature was then raised from 37° to 42° C. and, after 6 hours of digestion time, we centrifuged off the settlings. There were 410 cc.'s of centrifugate. The precipitate was bulky. The rate of separation was rapid and provided a brilliant filtrate, and the activity of the product was 145 mg./cc.

*Example V*

The process was carried through as described in Example IV except that the digestion time was 2 hours. There were 415 cc.'s of centrifugate. The rate of separation was rapid to form a clear filtrate. The activity of the product obtained by drying the filtrate was 141 mg./cc.

*Example VI*

The process was the same as that described in Example V except that 7½% of ethylene dichloride was used. There were 415 cc.'s of centrifugate. The rate of separation was rapid. The precipitate packed tightly after centrifuging and the filtrate was brilliant. The activity of the final product was 95 mg./cc.

*Example VII*

The process was substantially the same as that described in Example VI except that the digestion was carried on for 6 hours. The centrifugate amounted to 425 cc.'s. After centrifuging, the precipitate was tightly packed. The rate of separation was rapid and the filtrate was brilliant. The final product had an activity of 97 mg./cc.

*Example VIII*

Ten kilograms of frozen ground hog stomach linings were treated with the 40 liters of second extract, obtained in Example I above, at 0° C. for 2 hours. Upon centrifugation, 45 liters of extract with proteolytic activity after conversion, equivalent to 57 mg. 1:3000 (National Formulary Standard) pepsin per ml., were obtained. The extract was adjusted to pH 3.70 by the addition of 142 ml. 6 N. hydrochloric acid and was held at 0° to 5° C. for 3 hours. Upon centrifugation, 3.626 kg. of precipitate containing 90% of the proteolytic activity were obtained. A part of the precipitate (750 g.) was suspended in an equal weight of water, and treated as in Example I, yielding 81.8 gms. of dry powder with a proteolytic activity of 1:12,600 (National Formulary Standard).

*Example IX*

The extraction of 10 kg. of frozen hog stomach linings was repeated as described in Example I, and yielded 45 liters of the extract containing proteolytic activity after conversion equivalent to 78 mg. of 1:3000 (National Formulary Standard) pepsin per ml. The extract was adjusted to pH 3.54 with 99 ml. of 6 N. HCl and held at 0° to 5° C. for 95 hours before centrifugation. The precipitate thus obtained weighed 3.237 kg. and contained 70% of the proteolytic activity of the initial extract.

*Example X*

Thirty kilograms of frozen ground hog stomach linings were suspended in 90 liters of cold water. To the suspension, which was maintained at 0° to 5° C., were added over a period of one-half hour 30 liters of cold water containing 360 grams of NaOH (30 cc. 1 N.NaOH/kg. of tissue). The extraction was continued for a half hour after completion of the addition, at which time the pH was 8.2. Upon centrifugation, the suspension yielded 120 liters of centrifugate containing a proteolytic activity after conversion equivalent to 80 mg./ml. of 1–3000 (National Formulary Standard) pepsin.

The extract was warmed to 10° C. and adjusted to pH 3.75 by the addition of 450 ml. of 6 N.HCl. The suspension was maintained between 5° to 10° C. for 1 hour before centrifugation. The precipitate obtained weighed 8.695 kg. and contained 87% of the proteolytic activity.

Part of the precipitate (166 g.) was suspended in twice its weight of water and while still below 37° C., 35 ml. of n-butanol were added with agitation. The liquid was then warmed to 37° C. and adjusted to pH 1.45. The precipitate was removed and discarded. The filtrate was adjusted to pH 5.2, clarified, and 100 ml. of the filtrate dried from the frozen state, yielding 5.2 gms. of dry powder with a proteolytic activity of 1:11,500 (National Formulary Standard).

Another 166 gms. of precipitate were suspended and processed as in the above paragraph, except that ethyl acetate was used instead of n-butanol. 100 ml. of the filtrate yielded 7.3 gms. of dry powder having a proteolytic activity 1:10,300 (National Formulary Standard).

*Example XI*

The extraction method was essentially the same as in Example X, using 4 kg. of ground frozen hog stomach linings to obtain 16 liters of extract containing a proteolytic activity after conversion equivalent to 76 mg./ml. of 1–3000 (National Formulary Standard) pepsin.

The extract was warmed to 10° C. and adjusted to pH 2.50 with 6 N.HCl. The pH was then adjusted to 3.65 with NaHCO₃, and held at 5° to 10° C. for 1 hour before centrifugation. The precipitate obtained weighed 800 gms. and contained 89% of the proteolytic activity present in the initial extract. Fifty grams of the precipitate were suspended in an equal weight of cold water and dried from the frozen state. The yield was 11.25 g. of crude dry powder having a proteolytic activity of 1:15,000 (National Formulary Standard).

*Example XII*

The extraction method was essentially the same as Example X, using 1 kg. of ground frozen hog stomach linings to obtain 4 liters of extract containing a proteolytic activity on conversion equivalent to 72 mg./ml. of 1:3000 (National Formulary Standard) pepsin. The extract was warmed to 10° C. and pH 2.20 attained with 12 N.HCl. The pH was then adjusted to 3.06 with NaHCO₃ and held for one-half hour before centrifugation. The precipitate obtained weighed 220 gms. and contained 83% of the proteolytic activity present in the initial extract.

*Example XIII*

The extraction method was essentially the same as Example X, using one kilogram of ground frozen hog stomach linings to prepare 4 liters of extract having proteolytic activity on conversion equivalent to 82 mg./ml. of 1:3000 (National Formulary Standard) pepsin.

The extract was adjusted to pH 4.60 with 6 N.HCl; warmed to 10° C., and maintained at this temperature for one-half hour prior to centrifugation. The precipitate obtained contained 73% of the proteolytic activity present in the initial extract.

Example XIV

To one kilogram of precipitate, obtained as in Example X, was added twice its weight of water. To the suspension was added 225 ml. of methylethyl ketone and the temperature raised to 37° C. The suspension was adjusted to pH 1.50 and the material was allowed to digest overnight. The supernatant was adjusted to pH 4.40 and clarified. One liter of the filtrate yielded 35 gms. of dry powder with a potency of 1:13,300 (National Formulary Standard).

Example XV

To 500 g. of precipitate obtained as in Example X, was added an equal weight of water, and the suspension brought to pH 1.50 and held overnight at 37° C. An aliquot of the digestion mixture was treated with 1/10 volume of diethyl ether, causing an immediate flocculation of inactive material which was removed by filtration. The filtrate was found to contain 90% of the proteolytic activity of the initial precipitate.

While in the foregoing specification we have set out in great detail specific steps of a process illustrating the invention and specific reagents that may be employed, it will be understood that such details may be varied by those skilled in the art without departing from the spirit of our invention.

We claim:

1. In a process for the recovery of pepsin, the steps of extracting a raw source of pepsinogen with water, maintained at a temperature of about 0° to 10° C. adding acid to bring the pH to 3.0 to 4.5 at which inert protein with pepsinogen adsorbed thereon is precipitated, separating the precipitate and adsorbed pepsinogen, suspending the precipitate and adsorbed pepsinogen in water, adding an organic solvent and raising the temperature above 37° C. to convert the pepsinogen to pepsin, and separating the protein from the pepsin solution.

2. In a process for the recovery of pepsin, the steps of extracting a raw source of pepsinogen with water, maintained at a temperature of about 0° to 5° C. adding acid to bring the pH to 3.0 to 4.5 at which inert protein with pepsinogen adsorbed thereon is precipitated, separating the precipitate and adsorbed pepsinogen, suspending the precipitate and adsorbed pepsinogen in water, adding an organic solvent to defat the protein and at a temperature below 37° C., raising the temperature above 37° C. to convert pepsinogen to pepsin, and separating the solution of pepsin from said protein.

3. In a process for the recovery of pepsin, the steps of extracting a raw source of pepsinogen with water, maintained at a temperature of 0° to 5° C. adding acid to bring the pH to 3.0 to 4.5 at which inert protein with pepsinogen adsorbed thereon is precipitated, separating the precipitate and adsorbed pepsinogen, suspending the precipitate and adsorbed pepsinogen in water, adding to the suspension while at a temperature below 37° C. an organic solvent, raising the temperature of the suspension to about 37° C. and above to convert the pepsinogen to pepsin which dissolves in the water, and separating the water containing the dissolved pepsin from the protein precipitate.

4. In a process for the recovery of pepsin, the steps of extracting animal stomach linings with water, maintained at a temperature about 0° to 5° C. adding acid to bring the pH to about 3.0 to 4.5 to precipitate inert protein having pepsinogen adsorbed thereon, separating the precipitate and adsorbed pepsinogen from the water, resuspending in water said precipitate and adsorbed pepsinogen, adding an organic solvent, and then raising the temperature above 37° C. to convert the pepsinogen to pepsin which is soluble in water, and separating the solution of pepsin from the solids.

5. In a process for the preparation of pepsinogen in which a raw source of pepsinogen is extracted with water at a temperature of about 0° to 5° C. and an inert protein having pepsinogen adsorbed upon it is precipitated and separated, the step of suspending said precipitate and the adsorbed pepsinogen in water while maintaining the temperature below 37° C.

6. In a process for the preparation of pepsinogen in which a raw source of pepsinogen is extracted with water at a temperature of about 0° to 5° C. and an inert protein having pepsinogen adsorbed upon it is precipitated and separated, the steps of suspending said precipitate in water, and adding an organic solvent thereto while maintaining the temperature below 37° C. to prevent the conversion of pepsinogen to pepsin.

EUGENE P. KENNEDY.
MYRON D. GROSSNICKLE.

References Cited in the file of this patent

UNITED STATES PATENTS

| Number | Name | Date |
|---|---|---|
| 433,395 | Brill | July 29, 1890 |
| 2,145,796 | Keil et al. | Jan. 31, 1939 |

OTHER REFERENCES

Tauber, Chemistry and Technology of Enzymes, 1949, Wiley page 134.